Sept. 10, 1963  H. W. HARMAN  3,103,066
METHOD OF BUILDING OR REPAIRING A CRANK SHAFT
Filed March 31, 1959  3 Sheets-Sheet 1

*INVENTOR.*
HAL W. HARMAN
BY *Schmieding & Sultz*

ATTORNEYS

United States Patent Office 3,103,066
Patented Sept. 10, 1963

3,103,066
METHOD OF BUILDING OR REPAIRING A CRANK SHAFT
Hal W. Harman, El Paso, Tex., assignor of one-sixth each to Warren H. F. Schmieding and Palmer Fultz, both of Columbus, Ohio
Filed Mar. 31, 1959, Ser. No. 803,299
3 Claims. (Cl. 29—471.1)

The present invention relates to crank shafts and the method of making or repairing cracked or broken crank shafts.

One aspect of the present invention contemplates a crank shaft formed of at least two types of steel, i.e., a certain type of steel for the bearings, namely the main shaft or shaft sections and the throw or throws, and a more resilient type of steel for the connecting web or webs.

Another aspect of the invention comprises the repairing of a cracked crank shaft or the rebuilding of a broken crank shaft.

In general, the method of building a crank shaft and the repairing or rebuilding of a cracked or broken crank shaft is substantially the same. A crank shaft includes at least one main shaft or longitudinally aligned main shaft section, a laterally offset throw whose axis is parallel with the axis of the main shaft or shaft section, and a web or webs connecting the throw with the main shaft or main shaft sections. In practicing the method of the present invention, the new web or a new section of a web comprises superimposed steel plates, one side edge of each plate is welded to an end face of the main shaft or shaft section and that portion of the opposite side edge of the plate, which is disposed laterally of the main shaft or shaft section, is welded to an end face of the throw. The confronting faces of these superimposed steel plates are contiguous throughout their entire areas and substantially their entire areas are welded together.

Furher objects and advantages will be apparent from the following description, reference being had to the accompanying drawings wherein a preferred embodiment of the invention is illustrated.

Figure 3:
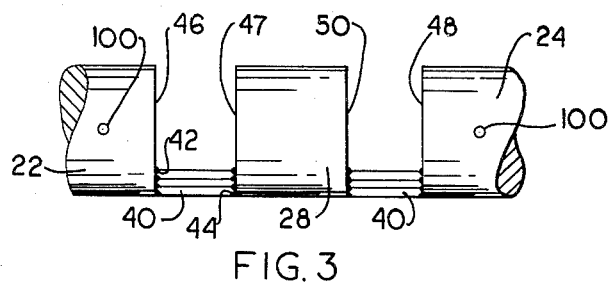
FIG. 3 is a view in elevation looking in the direction of Arrow 3 of FIG. 2 but showing only a few of the plates which form the webs.

Referring more in detail to the drawings, the crank shaft 20 includes a plurality of main shaft sections, three of which are shown at 22, 24 and 26. Only two of the several throws are shown and are indicated at 28 and 30. Shaft section 22 is connected to throw 28 by a web 32, and the shaft section 24 is connected to the throw 28 by a web 34. A web 36 connects the shaft section 24 with the throw 30, and a web 38 connects the throw 30 with the shaft section 26.

The webs 32, 34, 36 and 38 are each formed of a series of superimposed and laminated steel plates 40. The side edges 42 and 44 of these plates 40 are each beveled as is more clearly shown in FIG. 4. As viewed in FIG. 2 the side edge 42 of plates 40 is each welded to the end face 46 and the laterally extending portion of the side edges 44 are welded to the left face 47 of throw 28. Portions of the right edge 44 of the plates 40 of throw 34 are welded to the left face 48 of shaft section 24, and the extended portions of the left edge 42 of plates 40 of the throw 34 are welded to the right face 50 of throw 28. These beveled edges of the plates in cooperation with the faces of the shaft sections and throws, form gutters 52 for the assurance of obtaining a wide bond or weld between the side edges of the plates 40 and the faces of the shaft sections and throws. The gutters are filled with fused steel.

The confronting faces of the plates 40 are contiguous throughout their entire areas, and each of the plates is provided with a series of holes 54 which are arranged in staggered relationship with the holes of the next adjacent plates. These holes provide large pores for the reception of the welding steel and thereby provide a welding bond substantially throughout the entire area of the confronting faces of the plates. As an example, on a nine inch diameter shaft these plates are substantially five-eighths of an inch thick, and the holes have a diameter of one inch, and the center to center spacing of the holes is approximately three inches.

Figure 5:
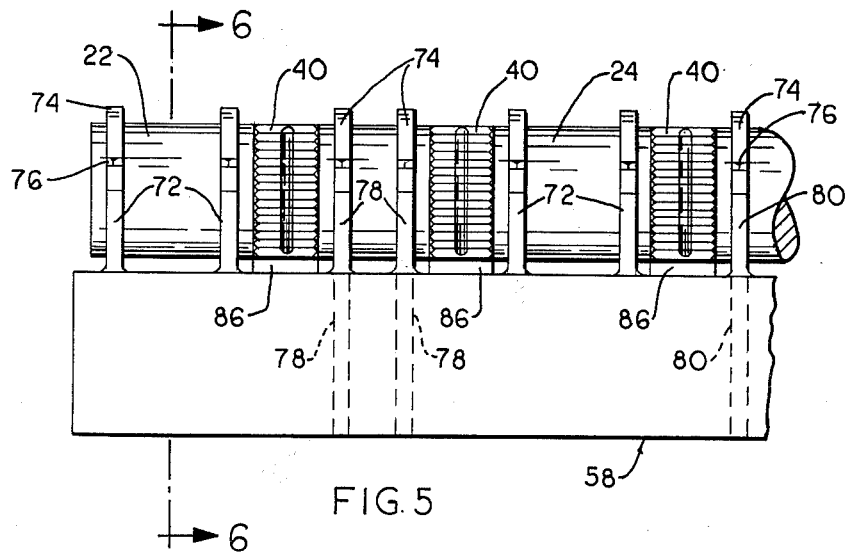
FIG. 5 is a side view of a jig used for manufacturing the crank shaft.
Figure 6:
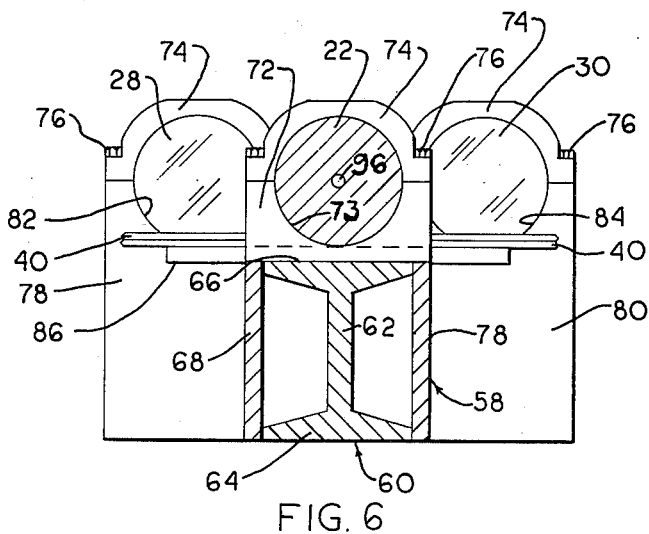
FIG. 6 is a sectional view taken on line 6—6 of FIG. 5.

Any suitable jig fixture 58 may be employed, and a simple embodiment is shown in FIGS. 5 and 6. In that embodiment the base 60 comprises an elongated steel I-beam 62 forming a base 64 and a platform 66. Elongated plates 68 and 78 are suitably secured to the sides of the I-beam as by welding. The platform 66 is provided with a plurality of semicircularly shaped plates 72. These plates extend longitudinally along the length of the platform 66 but each is disposed transversely thereof. The radius of the semicircle is the same as the radius of the shaft sections 22 or 24, and the center of the radius of the plates 72 are axially aligned. Thus the plates 72 provide saddles 73 for holding the shaft sections 22 and 24 in axial alignment. The shaft sections 22 and 24 are clamped in position by cleats 74 which are bolted on to the plates 72 by bolts 76.

The base 60 also includes pairs of laterally disposed plates 78 and 80. The pairs of plates 78 extend to the left of the base 60, as viewed in FIG. 6, and the pairs of plates 80 extend to the right. The plates 78 are suitably welded to the plate 68, and the plates 80 are suitably welded to the plate 70 of the base 60. The plates 78 are also provided with semicircularly shaped saddles 82, and the plates 80 are provided with semicircularly shaped saddles 84. The radii of the saddles 82 and 84 are the same as the radii of the throws 28 and 30. The axes of saddles 82 are aligned with one another on the left side of the jig and the axes of saddles 84 are aligned on the right side of the jig, and all of these axes for the saddles 73, 82 and 84 are disposed parallelly of one another. The distance, of course, between the axis of the saddle 73 and the axis of the saddle 82 or 84 is equal to the distance between the centers of the shaft sections and the throws. The throws 28 and 30 are clamped in position in the same manner as the shaft section 22 is clamped in position, as by cleats 74 and bolts 76. The platform 66 may also carry plates 86 for supporting the first web plates 40 which are to be attached to the shaft sections and the throws.

It will, of course, be understood that the jig 58 is shown in a simple form in which the throws 28 and 30 are disposed at 180 degrees with respect to one another, and that the jig 58 would take other forms depending upon the angular disposition of the throws with respect to one another. Also it is to be understood that each throw will be supported by at least two saddles.

In operation, after the shaft sections 22, 24 and 26 are clamped in position and the throws 28, 30, etc., are clamped in position, one of the plates 40 is placed upon the base plates 86 in a position to span, for example, the end face 46 of the shaft section 22 and the end face 47 of the throw 28 as is more clearly shown in FIG. 3. After the side edges of the web plate 40 are welded to the faces 46 and 47 and the gutter 52 filled with fused steel, the second web plate is superimposed and its ends are welded to the end faces 46 and 47, and this process is continued until the desired width web is attained. The welding process also includes pouring fused metal through the holes 54 in the plates and, as previously explained, the holes 54 in adjacent plates are staggered with respect to one another. In this manner substantially the entire contiguous confronting faces of the plates 40 are welded to one another. In this manner web 32 is formed. The other webs are formed in the same manner.

Figure 4:
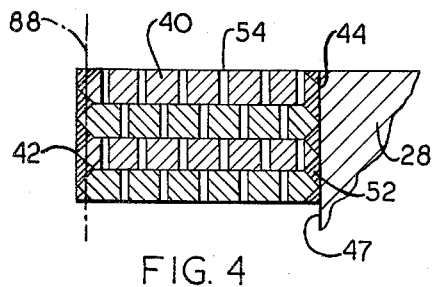
FIG. 4 is a sectional view taken on line 4—4 of FIG. 2, but on a somewhat larger scale.

After the welding is completed, the exposed sides of the plates are finished by cutting away the material as for example along the dot and dash line 88 in FIG. 4 so as to provide a smooth and good looking exterior finish on the webs, and to provide the curved circular shoulders 89 between the shaft sections 24 and between the throws and the webs.

Figure 2:
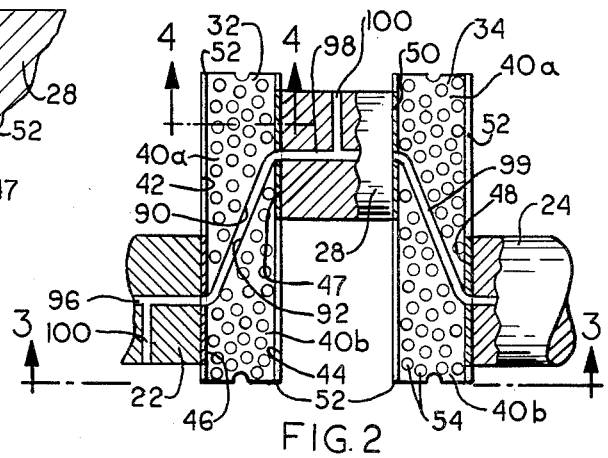
FIG. 2 is a view similar to FIG. 1 but showing parts in section and parts in elevation, and on a larger scale than that shown in FIG. 1.
Figure 1:
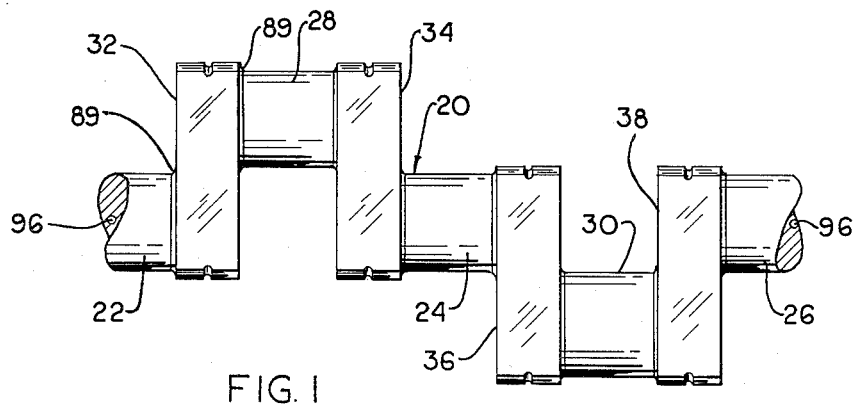
FIG. 1 is a fragmentary view of a crank shaft showing three main bearing sections, two throws and a pair of webs between each of the bearing sections and the throws.

It will be observed from FIG. 2 that oil ducts can be formed in the webs while the web is being formed. To accomplish this, one of the layers of laminated web may be formed of two plates 40a and 40b. The confronting edges 90 and 92 of these plates 40a and 40b are spaced from one another, disposed at the desired angle and arranged parallelly to form a groove 94 which in turn becomes a confining duct when the next full sized plate 40 is superimposed. The groove 94 is disposed at such angle so that it registers with the hole 96 in the shaft section 22 and the hole 98 in the throw 28. Like ducts 94 are provided in each of the webs whereby each of the main bearing sections and throws receive lubricant. The dissipating holes in the shafts are shown at 100. Or, if desired, pipes such as pipe 99 may be welded to a plate 40 and welded to the shafts and throws in registry with the holes or passages 96 and 98. Here again plates, similar to plates 40a and 40b would be used. The pipe would have an outside diameter equal to the thickness of plates 40a and 40b, and the next superimposed plate 40 would be welded to plates 40a and 40b and the pipe 99.

Preferably the web plates 40 are formed of a mild steel, low in carbon content, high resistance to metal fatigue, and will not harden materially when quenched. The shafts and throws are formed of steel having a high carbon content such as die or tool steel, which may be easily tempered and which may contain chrome or molybdenum.

Thus it will be seen from the foregoing that I have provided a new type of all-steel crank shaft having the desirable bearing metal characteristics for the shafts (the shafts including the main shaft sections and the throws), and in which the webs are relatively resilient, resulting in a shaft that will not readily crack or break because of wear or misalignment of the bearings.

Figure 10:
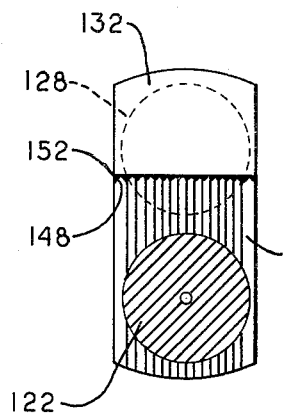
FIG. 10 is a view looking in the direction of numerals 10—10 of FIG. 9.
Figure 9:
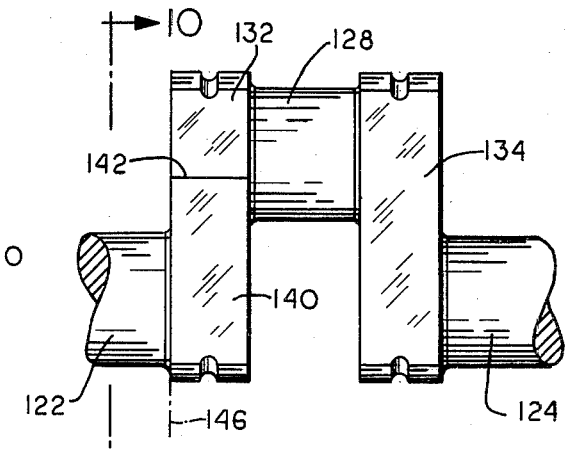
FIG. 9 is a fragmentary view of the crank shaft shown in FIG. 7, but after the same has been repaired.
Figure 8:
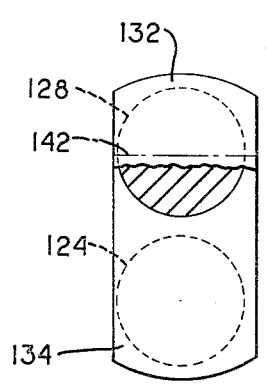
FIG. 8 is a view looking in the direction of the arrows 8—8 of FIG. 7.
Figure 7:
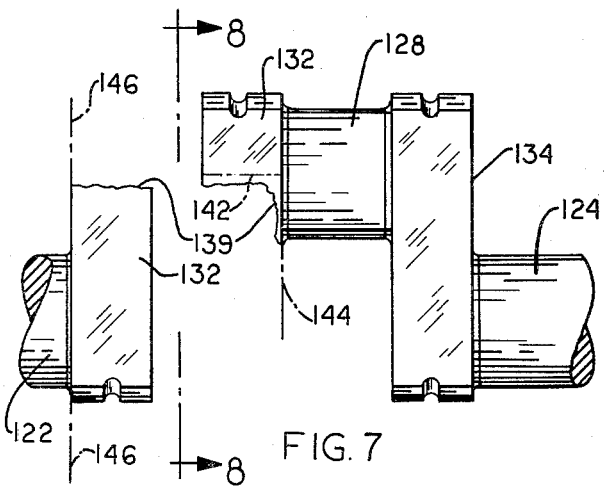
FIG. 7 is a fragmentary view of a crank shaft which has been cracked and broken away at a web.

As previously stated, another aspect of the present invention lies in the use of the method in repairing broken crank shafts. For example should there be a break in the web 132 as is shown in FIG. 7 at 139, the metal would be cut away as shown by the dot and dash lines 142 and 144 on the one piece and the entire remaining part of the web would be cut away from the shaft section 122 along the dot and dash line 146. The shaft section 122 would then be clamped in a fixture in the same manner as shaft 22 was clamped, and the other part of the crank shaft including throw 128 and web 134 would also be clamped in the jig by clamping throw 128 and shaft section 124 in position in the same manner as throw 28 and shaft section 24 was clamped in position. Then plates 140 will be welded in position in the same manner as was explained with respect to plates 40. These plates however will extend only from the finished surface 142 on the old web 132. Preferably, in addition to having both side edges beveled, as was done at 42 with plates 40, an end edge 148 is beveled to provide gutters 152 with the surface 142, which gutters are filled with fused metal. This finished repaired crank shaft is shown in FIG. 9, however, in FIG. 10, for the sake of illustration, the plates 140 are shown prior to finishing the side edges thereof. It will of course be understood that the plates 140 are welded to the complete end face of the shaft section 122 in the same manner as was pointed out with respect to the welding of plates 40 to the end face of shaft section 22, and, the right side edge (as viewed in FIG. 9) of the plates 140, which are contiguous with the left end face of throw 128, are welded to the left end face throughout their entire contiguous areas.

This aspect of the present invention is particularly useful in repairing large crank shafts such as those employed on large diesel engines and in power plants, wherein the crank shaft is usually formed of drop forging and originally costs in the thousands of dollars. By this aspect of the invention, I have been able to repair broken and cracked castings at a fraction of the cost of a new crank shaft. In many instances the repaired crank shaft is better than a new one, in that in the new one quite often internal strains are present in the metal, and under severe strain is apt to crack or break; whereas in many instances after the strain has been released by the cracking or breaking, and by my present method of repairing, the strain does not reoccur.

While the form of embodiment herein shown and described constitutes a preferred form, it is to be understood that other forms may be adopted falling within the scope of the claims that follow.

I claim:

1. Those steps in the method of building or repairing a crank shaft of the type having a main shaft formed of metal, at least one throw formed of metal, the axis of which is arranged parallelly of but spaced laterally of the main shaft section, and a metallic web connecting the throw with the shaft section, which steps in the method comprise welding at least a portion of the side edge of a steel plate to the end of the main shaft and welding at least a portion of the opposite side edge of the steel plate, which latter edge portion is offset laterally of the main shaft section, to an end of the throw; superimposing like plates on one another, each plate having a plurality of holes therethrough in non-alignment with holes in next adjacent plates; fusing weld metal to the sides, defining the said holes, and the exposed surfaces of the next adjacent plate and welding like edges of the superimposed plates to the main section and throw as aforesaid with respect to the first mentioned plate.

2. The method as defined in claim 1, characterized in that certain edges of certain plates, which edges are welded to the main shaft and throw, are beveled and that the gutters thus formed by the beveled edges and shaft and throw are filled with welding material.

3. The method as defined in claim 1, characterized in forming an oil duct in a web by forming one of the inner layers of plates of two plates having their confronting edges spaced from one another and disposed at an angle to form a groove leading from an area within the confines of the said end of the main shaft section to an area within the confines of the said end of the throw.

References Cited in the file of this patent

UNITED STATES PATENTS

| | | |
|---|---|---|
| 954,923 | Brock | Apr. 12, 1910 |
| 1,063,323 | Bock | June 3, 1913 |
| 1,210,996 | Slate | Jan. 2, 1917 |
| 1,220,771 | Murray | Mar. 27, 1917 |
| 1,282,672 | Blumberg | Oct. 22, 1918 |
| 1,399,806 | Scofield | Dec. 13, 1921 |
| 1,431,415 | Parsons et al. | Oct. 10, 1922 |
| 1,512,973 | Bennett et al. | Oct. 28, 1924 |
| 1,515,162 | Murray et al. | Nov. 11, 1924 |
| 1,698,034 | Stringfellow | Jan. 8, 1929 |
| 1,789,579 | D'Agostino | Jan. 20, 1931 |
| 1,875,682 | Walker | Sept. 6, 1932 |
| 1,901,175 | Lack | Mar. 14, 1933 |
| 2,237,685 | Neuland | Apr. 8, 1941 |
| 2,364,109 | Taylor | Dec. 5, 1944 |
| 2,729,117 | Maybach et al. | Jan. 3, 1956 |
| 2,730,912 | Marinelli | Jan. 17, 1956 |
| 2,820,286 | Andrus | Jan. 21, 1958 |

FOREIGN PATENTS

| | | |
|---|---|---|
| 665,129 | Germany | Sept. 17, 1938 |
| 16,854 | Great Britain | Oct. 25, 1886 |

OTHER REFERENCES

Curvic Couplings, July 18, 1958, published by Gleason Works, 1000 University Avenue, Rochester 3, New York; pages 4 and 5 of this publication are pertinent.

Welding Handbook, 3rd Ed., pub. by the American Welding Society, pp. 875 and 876.